United States Patent [19]

Armbruster et al.

[11] 4,159,206

[45] Jun. 26, 1979

[54] WEATHERABLE, ABRASION RESISTANT COATING COMPOSITION, METHOD, AND COATED ARTICLES

[75] Inventors: David C. Armbruster, Summit, N.J.; William F. Fischer, Langhorne, Pa.

[73] Assignee: Rohm and Haas Company, Philadelphia, Pa.

[21] Appl. No.: 779,194

[22] Filed: Mar. 18, 1977

[51] Int. Cl.$^2$ .......................... B32B 9/64; C09K 3/14; C09K 3/00
[52] U.S. Cl. .......................... 106/287.12; 106/287.13; 106/287.34; 260/29.2 M; 428/447
[58] Field of Search .................. 106/287 SE, 287 SB, 106/308 Q; 260/29.2 M, 41.15; 428/447

[56] References Cited

U.S. PATENT DOCUMENTS

| 2,568,384 | 9/1951 | Cheronis | 260/29.2 M |
| 2,676,182 | 4/1954 | Daudt et al. | 106/308 Q |
| 3,232,771 | 2/1966 | Pearce | 106/38.35 |
| 3,959,566 | 5/1976 | Pangonis | 106/287.16 |
| 4,027,073 | 5/1977 | Clark | 260/29.2 M |

*Primary Examiner*—Theodore Morris
*Attorney, Agent, or Firm*—Michael B. Fein

[57] ABSTRACT

A weatherable coating composition, especially for imparting abrasion resistance to thermoplastic substrates, comprising about 30–50 parts by weight of a colloidal silica and about 50 to 70 parts by weight of a mixture of (i) dialkyldialkoxysilane and (ii) alkyl trialkoxysilane wherein the weight ratio of (i) to (ii) is about 1:19 to about 1:4. A method of applying the coating composition to a substrate and coated articles are also disclosed.

10 Claims, No Drawings

WEATHERABLE, ABRASION RESISTANT COATING COMPOSITION, METHOD, AND COATED ARTICLES

BACKGROUND OF THE INVENTION

1. Field of the Invention

This invention relates to silicone-based weatherable abrasion resistant coating compositions, methods of preparation and use, and coated articles.

2. Description of the Prior Art

There have been many attempts by others to provide abrasion resistant coating compositions which possess optimum balance of properties. Especially in the field of coating thermoplastics, the achievement of this goal has been elusive. Clark, Belgian Pat. 821,403, shows a coating composition comprising a dispersion of colloidal silica in lower aliphatic alcohol-water solution of the partial condensate of a silanol of the formula $RSi(OH)_3$ in which R is selected from the group consisting of alkyl radicals of 1 to 3 inclusive carbon atoms, the vinyl radical, the 3,3,3-trifluoropropyl radical, the gamma-glycidoxypropyl radical, and the gamma-methacryloxypropyl radical, at least 70 weight percent of the silanol being $CH_3Si(OH)_3$, said composition containing 10 to 50 weight percent solids consisting essentially of 10 to 70 weight percent colloidal silica and 30 to 90 weight percent of the partial condensate, said composition containing sufficient acid to provide a pH in the range of 3.0 to 6.0. Clark's coating composition achieves the goal of adequate abrasion resistance, but it suffers from a few disadvantages; for example, it crazes after being soaked in water and it does not weather adequately.

Several patents assigned to Du Pont, U.S. Pat. Nos. 3,429,845; 3,429,846; 3,651,003; and 3,819,562 show abrasion resistant coatings based on fluorocarbon monomers and monomers containing hydroxyl groups and glycidyl groups. The latter coatings are difficult to apply, poor in humidity resistance, and expensive.

SUMMARY OF THE INVENTION

It is an object of the present invention to provide an economical, weatherable, abrasion-resistant coating which is easy to apply. Another object is to provide improved methods of applying abrasion resistant coatings. A further object is to provide coated articles having improved weatherability and abrasion resistance.

These and other objects as will become apparent from the following description are achieved by the present invention which comprises, in one aspect, a coating composition comprising colloidal silica and a mixture of dialkyldialkoxysilane and alkyltrialkoxysilane.

In another aspect, the invention comprises a method of making weatherable abrasion resistant coated substrates comprising adding a dilute acid hydrolyzing agent and a condensation catalyst to a composition comprising about 30–50 parts by weight of a colloidal silica and about 50–70 parts by weight of a mixture of (i) dialkyldialkoxysilane and (ii) alkyltrialkoxysilane wherein the weight ratio of (i) to (ii) is about 1:19 to about 1:4. In another aspect, the invention comprises the resultant coated articles.

DETAILED DESCRIPTION OF THE INVENTION AND DESCRIPTION OF THE PREFERRED EMBODIMENTS

It has been discovered that the use of a mixture of dialkyldialkoxysilane with alkyltrialkoxysilane improves the craze resistance and weatherability as compared with the analogous coating composition which contained only alkyltrialkoxysilane. Surprisingly, only a minor effect on abrasion resistance has been found when dialkoxysilanes are substituted in part.

In the coating system of the invention, the silane generates the corresponding silanols in situ by addition of the corresponding di- and trialkoxysilanes to acidic aqueous dispersions of colloidal silica. The resulting composition comprises a dispersion of colloidal silica in lower aliphatic alcohol-water solution of the partial condensate of a mixture of silanols, one having the formula $RSi(OH)_3$ and one having the formula $RR'Si(OH)_2$ in which R and R' are selected independently from the group consisting of alkyl radicals of 1 to 3 inclusive carbon atoms, the vinyl radical, the 3,3,3-trifluoropropyl radical, the gamma-glycidoxypropyl radical, the gamma-acryloxypropyl radical, and the gamma-methacryloxypropyl radical, said composition containing 10 to 50 weight percent solids, the ratio of colloidal silica to partial condensate being about 1/1 to 3/7 by weight, said composition containing sufficient acid to provide a pH in the range of 3.0 to 6.0.

As described above, the nonvolatile solids portion of the coating composition is a mixture of colloidal silica and the partial condensate of a mixture of a silanols. The silanols are generated in situ by hydrolysis of the corresponding mixture of (i) dialkyldialkoxysilane and (ii) alkyltrialkoxysilane. The weight ratio of (i) to (ii) is preferably about 1:19 to about 1:4. Suitable dialkoxy and suitable trialkoxysilanes are those containing methoxy, ethoxy, isopropoxy and t-butoxy substituents, which upon hydrolysis liberate the corresponding alcohol, thereby generating at least a portion of the alcohol present in the coating composition. Upon generation of the silanol in the acidic aqueous medium, there is condensation of the hydroxyl substituents to form —Si-O-Si— bonding. The condensation is not complete, but rather the siloxane retains an appreciable quantity of silicon-bonded hydroxyl groups, thus rendering the polymer soluble in the water-alcohol solvent. This soluble partial condensate can be characterized as a siloxanol polymer having at least one silicon-bonded hydroxyl group per every three —SiO— units.

The silica component of the composition is present as colloidal silica. These silica dispersions are prepared by methods well-known in the art and are commercially available under such registered trademarks as "Ludox" and "Nalcoag." It is preferred to use colloidal silica of 50–400 (more preferably 60–150) millimicron particle size in order to obtain dispersions having a greater stability and to provide coatings having superior properties. Colloidal silica is distinguished from other water dispersable forms of $SiO_2$, such as non-particulate polysilicic acid or alkali metal silicate solutions, which are not operative in the practice of the present invention.

The silica is dispersed in a solution of the siloxanol polymer carried in a lower aliphatic alcohol-water co-solvent. Suitable lower aliphatic alcohols include methanol, ethanol, n-propanol, isopropanol, and t-butyl alcohol. Mixtures of such alcohols can be used. Propanols are the preferred alcohols and when mixtures of alcohol are utilized it is preferred to utilize at least 50 weight percent of propanols in the mixture to obtain optimum adhesion of the coating. The solvent system should contain from about 20 to 75 weight percent alcohol to ensure solubility of the siloxanol. Optionally, one can utilize an additional water-miscible polar solvent, such as acetone, butyl cellosolve and the like in a minor amount, for example, no more than 20 weight percent of the cosolvent system. Alcohol miscible solvents such as toluene can also be used.

To obtain optimum properties in the coating and to prevent immediate gelation of the coating composition, sufficient acid to provide a pH of about 3.0 to 6.0 (preferably 4.0–5.0) must be present. Suitable acids include both organic and inorganic acids such as hydrochloric, acetic, chloroacetic, citric, benzoic, dimethylmalonic, formic, propionic, glutaric, glycolic, maleic, malonic, toluenesulfonic, oxalic and the like. It is preferred to add sufficient water-miscible carboxylic acid selected from the group consisting of acetic, formic, propionic and maleic acids to provide pH in the range of 4 to 5 in the coating composition. In addition to providing good bath life, the alkali metal salts of these acids are soluble, thus allowing the use of these acids with silicas containing a substantial (greater than 0.2% NaO) amount of alkali metal or metal oxide. The most preferred acid is acetic.

The coating compositions are easily prepared by adding a mixture of dialkoxysilane and trialkoxysilanes, such as $RR'Si(OCH_3)_2$ and $RSi(OCH_3)_3$, respectively, to colloidal silica hydrosols and adjusting the pH to the desired level by addition of the organic acid. The acid can be added to either the silane or the hydrosol prior to mixing the two components provided that the mixing is done rapidly. Alcohol is generated by hydrolysis of the alkoxy substituents of the silane, for example, hydrolysis of one mole of $-Si(OC_2H_5)_3$ generates 3 moles of ethanol. Depending upon the percent solids desired in the final composition, additional alcohol, water, or a water-miscible solvent can be added. The composition should be well mixed and allowed to age for a short period of time to ensure formation of the partial condensate. The coating composition thus obtained is a low viscosity fluid which is stable for several days. The condensation of silanols continues at a very slow rate and the composition will eventually form gel structures. The bath life of the composition can be extended by maintaining the dispersion at below room temperature, for example, at 40° F.

Buffered latent condensation catalysts can be added to the composition so that milder curing conditions can be utilized to obtain the optimum abrasion resistance in the final coating. Alkali metal salts of carboxylic acids, such as potassium formate, are one class of such latent catalysts. The amine carboxylates and quaternary ammonium carboxylates are another such class of latent catalysts. Of course, the catalysts must be soluble or at least miscible in the cosolvent system. The catalysts are latent to the extent that at room temperature they do not appreciably shorten the bath life of the composition, but upon heating the catalysts dissociate and generate a catalytic species able to promote condensation, for example an amine. Buffered catalysts are used to avoid effects on the pH of the composition. Certain of the commercially available colloidal silic dispersions contain free alkali metal base which reacts with the organic acid during the adjustment of pH to generate the carboxylate catalysts in situ. This is particularly true when starting with a hydrosol having a pH of 8 or 9. The compositions can be catalyzed by addition of carboxylates such as dimethylammonium acetate, ethanolammonium acetate, dimethylamilinium formate, tetraethylammonium benzoate, sodium acetate, sodium propionate, sodium formate or benzyltrimethylammonium acetate. The amount of catalyst can be varied depending upon the desired curing condition, but at about 1.5 weight percent catalyst in the composition, the bath life is shortened and optical properties of the coating may be impaired. It is preferred to utilize from about 0.05 to 2 weight percent of the catalyst.

To provide the greatest stability in the dispersion form while obtaining optimum properties in the cured coating, it is preferred to utilize a coating composition having a pH in the range of 4–5 which contains 10–30 weight percent solids; the silica portion having a particle size in the range of 60–150 millimicrons; the partial condensate of silanols being present in an amount in the range of 50 to 70 weight percent of the total solids in a cosolvent of methanol, isopropanol and water, the alcohols representing from 30 to 60 weight percent of the cosolvent and a catalyst selected from the group consisting of sodium acetate and benzyltrimethylammonium acetate being present in an amount in the range of 0.05 to 0.5 weight percent of the composition. Such a composition is relatively stable, having a bath life of approximately one month, and, when coated onto a substrate, can be cured in a relatively short time at temperatures in the range of 70°–160° C. to provide a weatherable transparent abrasion resistant surface coating.

The coating compositions of the invention can be applied to solid substrates by conventional methods, such as flowing, spraying, or dipping to form a continuous surface film. Although substrates of soft plastic sheet material show the greatest improvement upon application of the coating, the composition can be applied to other substrates, such as wood, metal, printed surfaces, leather, glass, ceramics, and textiles. As noted above, the compositions are especially useful as coatings for dimensionally stable synthetic organic polymeric substrates in sheet or film form, such as acrylic polymers, for example, poly(methyl methacrylate), polyesters, for example poly(ethylene terephthalate) and polycarbonates, such as poly(diphenylolpropane carbonate) and poly(diethylene glycol bis allyl carbonate), polyamides, polyimides, copolymers of acrylonitrile-styrene, styrene-acrylonitrile-butadiene copolymers, poly(vinyl chloride), cellulose acetate, cellulose triacetate, cellulose acetate butyrate, cellulose propionate, ethyl cellulose, polyethylene and the like. Transparent polymeric materials coated with these compositions are useful as flat or curved enclosures, such as windows, skylights and windshields, especially for transportation equipment. Plastic lenses, such as acrylic or polycarbonate ophthalmic lenses, can be coated with the compositions of the invention. In certain applications requiring high optical resolution, it may be desirable to filter the coating composition prior to applying it to the substrate. In other applications, such as corrosion-resistant coatings on metals, the slight haziness (less than 5%) obtained by the use of certain formulations, such as those containing citric acid and sodium citrate, is not detrimental and filtration is not necessary.

By choice of proper formulation, including solvent, application conditions and pretreatment (including the use of primers) of the substrate, the coatings can be adhered to substantially all solid surfaces. A hard solvent-resistant weatherable surface coating is obtained by removal of the solvent and volatile materials. The composition will air dry to a tack-free condition, but heating in the range of 50° to 150 C. is necessary to obtain condensation of residual silanols in the partial condensate. This final cure results in the formation of a highly crosslinked network and greatly enhances the abrasion resistance of the coating. The coating thickness can be varied by means of the particular application technique, but coatings of about 0.5 to 20 micron preferably 2–10 micron thickness are generally utilized. Especially thin coatings can be obtained by spin coating.

The following examples are illustrative and not to be construed as limiting of the invention delineated in the claims.

EXAMPLES

In all examples sodium acetate trihydrate, the catalyst, was dissolved in water and the colloidal silica dispersion (Nalcoag 1060) was added to it. The pH of this solution was adjusted to 4.0 using glacial acetic acid. This solution was cooled to 10°–20° C., and was then added all at once to the silica suspension with good agitation. The exotherm was kept below 30° C. using an ice bath. Once the exotherm had occurred the solution was allowed to come to room temperature with continuous stirring for at least 1 hour. The pH was again adjusted to 4.5 using glacial acetic acid.

EXAMPLE I

Coating mix of the following composition was used:

| | |
|---|---|
| Water (+NaOAc . 3H$_2$O) | 33.3 g (+0.62g) |
| Colloidal silica, 60 millimicron | 50.0 g |
| Acetic acid (glacial) | 2.5 g |
| Methyl trimethoxysilane | 46.7 g |
| Dimethyl dimethoxysilane | 4.8 g |

The coating mix was diluted to 20% solids with isopropanol 24 hours after preparation. The diluted coating mix was aged for an additional 6 days before it was applied to acrylic sheet. The sheet was prewashed with isopropanol and primed with 20 percent glacial acetic acid solution in isopropanol and allowed to dry for 20 minutes before being coated. A weatherable, abrasion resistant coated sheet was obtained.

EXAMPLE II

The coating mix composition:

| | |
|---|---|
| Water (+NaOAc . 3H$_2$O) | 26.64 (+0.49.2g) |
| Colloidal silica, 60 millimicron | 39.96 g |
| Acetic acid (glacial) | 2.8 g |
| Methyl trimethoxysilane | 37.3 g |
| Dimethyl dimethoxysilane | 2.6 g |

The mix was diluted to 20% solids after 24 hours and aged 48 hours after dilution. Acrylic sheet primed with 10 percent solution of acetic acid in isopropanol was coated. Good abrasion resistant coating was obtained.

EXAMPLE III

The coating mix composition:

| | |
|---|---|
| Water (+NaOAc . 3H$_2$O) | 16.0 g (0.293g) |
| Colloidal silica, 60 millimicron | 23.98 g |
| Acetic acid (glacial) | 1.65 g |
| Methyl trimethoxysilane | 45.5 g |
| Dimethyl dimethoxysilane | 9.1 g |

The mix was used as in Example II. A good abrasion resistant coating was obtained.

EXAMPLE IV

The coating mix composition:

| | |
|---|---|
| Water (+NaOAc . 3H$_2$O) | 216.2 g (+14.3g) |
| Colloidal silica, 60 millimicron | 504.0 g |
| Acetic acid (glacial) | 26.0 g |
| Methyl trimethoxysilane | 1073.5 g |
| Dimethyl dimethoxysilane | 95.28 g |

The coating mix was diluted to 20% solids with isopropanol after 24 hours and 48 hours after dilution the mix was applied to acrylic sheet, washed with isopropanol and primed with 15% acetic acid solution in isopropanol. An excellent, weatherable coating was obtained.

EXAMPLE V

The coating mix composition of Example IV was diluted to 12 percent solids with isopropanol and applied as described in Example IV. A good abrasion resistant coating was obtained.

EXAMPLE VI

The coating mix composition of Example IV was diluted to 20% solids with isopropanol after 24 hours and 48 hours, later the coating mix was applied to polycarbonate sheet washed with isopropanol and 'prime coated' with 6% solution of poly(methyl methacrylate) in a 50/50 mixture of isopropanol and toluene containing 1% (of solids) of Tinuvin 327 and 0.5% (on solids) of Cyasorb 1084 as UV stabilizers. The prime solution also contains 0.3% (on total weight) of DC-7 and 0.01% (on total weight) of FC 431 as leveling agents. A clear, level weatherable abrasion resistant coating with excellent adhesion was obtained.

EXAMPLE VII (Comparative)

A coating solution was prepared according to the teachings of Belgian 821,403 and applied to both unprimed acrylic sheet and to acrylic sheet primed with 20% solution of acetic acid in isopropanol. The initial adhesion on primed sheet was good but on unprimed sheet the adhesion was fair. The coatings, however, crazed when immersed in water at 140° F. in 3 to 4 days and accelerated weathering in the Modified Xenon Arc Weather-O-Meter resulted in severe crazing within 500 hours.

EXAMPLE VIII (Comparative)

The coated sheet prepared in Example VII in accordance with Belgian Patent 821,403 is compared to the analogous coated sheet of the invention prepared in Example IV. The following Table gives the properties of the comparative coated sheets.

| Coating | Abrasion Resistance | Hot Water (140° F.) Stability (days) | Modified Xenon Arc Weathering (Hours) |
| --- | --- | --- | --- |
| Be 821,403 | Excellent | 3-4 (crazing) | 500 (crazing) |
| Example IV of present invention | Good | 30 | 4000 |

We claim:

1. A weatherable abrasion-resistant coating composition comprising (A) about 30 to 50 parts by weight colloidal silica, and (B) about 50 to 70 parts by weight of a mixture of (i) dialkyldialkoxysilane and (ii) alkyl trialkoxysilane, wherein the weight ratio of (i) to (ii) is about 1:19 to about 1:4.

2. The composition of claim 1 wherein the silanes are partially hydrolyzed to silanols.

3. The composition of claim 1 wherein the colloidal silica has a particle size of about 50 to 400 millimicrons.

4. The composition of claim 1 further including condensation catalyst.

5. The composition of claim 1 further including water.

6. The composition of claim 1 in a solvent.

7. The composition of claim 6 wherein the solvent is an alcohol.

8. The composition of claim 1 further including a weak acid as a hydrolyzing agent.

9. The composition of claim 1 wherein the hydrolyzing agent is glacial acetic acid.

10. The composition of claim 1 wherein the dialkyldiakoxysilane is dimethyldimethoxysilane, the alkyl trialkoxysilane is methyl trimethoxysilane, further including glacial acetic acid as hydrolyzing agent.

* * * * *